Figure 1:
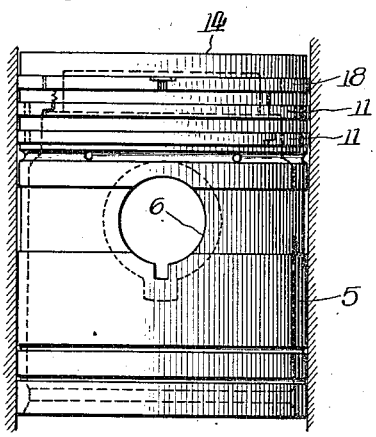

July 3, 1923. 1,460,535
D. P. DAVIES
PISTON
Filed March 9, 1921   2 Sheets-Sheet 1

Witness:
A. J. Sanser.

Inventor:
David P. Davies
By James A. Walsh, Atty.

July 3, 1923.

D. P. DAVIES

PISTON

Filed March 9, 1921    2 Sheets-Sheet 2

1,460,535

Witness:
A. J. Sauser.

Inventor:
David P. Davies,
By James A. Walsh,
Atty.

Patented July 3, 1923.

1,460,535

UNITED STATES PATENT OFFICE.

DAVID P. DAVIES, OF RACINE, WISCONSIN, ASSIGNOR TO J. I. CASE THRESHING MACHINE COMPANY, OF RACINE, WISCONSIN, A CORPORATION.

PISTON.

Application filed March 9, 1921. Serial No. 450,833.

*To all whom it may concern:*

Be it known that I, DAVID P. DAVIES, a citizen of the United States, residing at Racine, in the county of Racine and State of Wisconsin, have invented certain new and useful Improvements in Pistons, of which the following is a specification.

In the operation of internal combustion engines involving the observation of the action and efficiency thereof, it has resulted in the conclusion of a well established fact that the low grade of fuel in use at the present time has a tendency to break down or materially weaken the consistency of the oil film of the cylinder walls, which condition produces greater friction between the rings of the piston and such surrounding cylinder wall. The piston rings, as is well understood, undergo reciprocating movement by the action of the engine piston, such rings being seated in grooves forming part of the piston, and the consequent friction between the cylinder wall and such rings and grooves develops excessive wear upon the sides of the rings and grooves, with the result that when such rings become unevenly worn or loose in the piston grooves the sealing qualities of the rings diminish and cause trouble in the way of leakage of the compression, passage of fuel into the crank-case and an excessive space or spaces for the working of the oil between the ring and cylinder. Upon investigation of a large number of tractor and automobile motors I have determined that such wear is about twice as great upon the first or top ring of the piston, that is, the one next to the explosion chamber, which wear is caused by the explosion pressure coming in direct contact with the exposed portion of the ring. Therefore, in order to compensate for the results of expansion the upper part of the piston must be turned to a lesser diameter than the skirt, which arrangement permits a portion of the top ring to be exposed to the pressure in the combustion chamber of the motor. I have found by experiment that a ring of comparative depth in cross section is highly advantageous when placed at the upper end of the piston, and is a material improvement upon the conventional type of snap ring ordinarily employed in motors, for the reason that the depth in cross section and thickness of the latter must be limited to impart to it the necessary spring force to enable it to be spread and slipped over a solid piston, and which dimensions are not sufficient to prevent the occurrence of wear on the ring and piston grooves induced by the consequent pressure and friction resulting from the reciprocal action of the piston in relation to the cylinder, but in order to utilize a ring of the desired depth to resist wear I find it preferable to construct the piston in two parts or sections. In thus providing such piston in two sections I am enabled to employ a ring of sufficient depth in cross section which will have adequate surface in the grooves to prevent wear, and by practical experience have demonstrated that when wear on the first or top ring is avoided such condition naturally results in keeping pressure away from the rings located below it, thus preserving such lower rings and preventing undue wear of the various surfaces thereof and of the grooves in which they are fitted.

In carrying out my invention I desire it to be understood that various modifications may be employed to accomplish the same results, and that, therefore, I have chosen to illustrate several mechanical changes which may be employed for receiving and controlling the piston rings in the manner hereinbefore indicated, without departing from the spirit of said invention.

Figure 2:
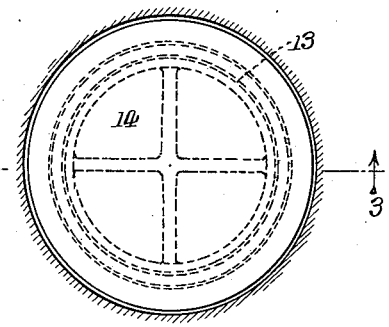
Figure 3:
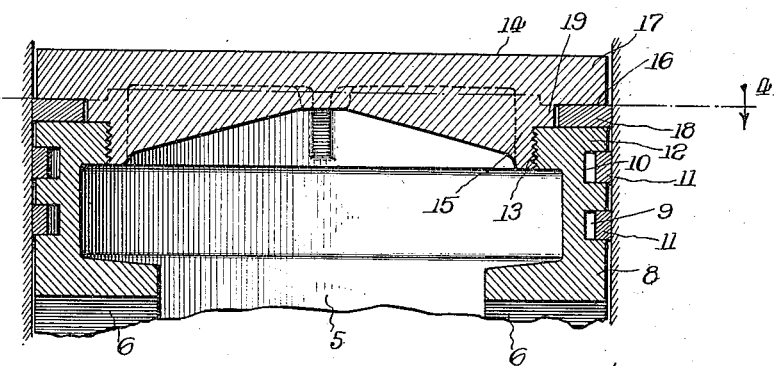
Figure 4:
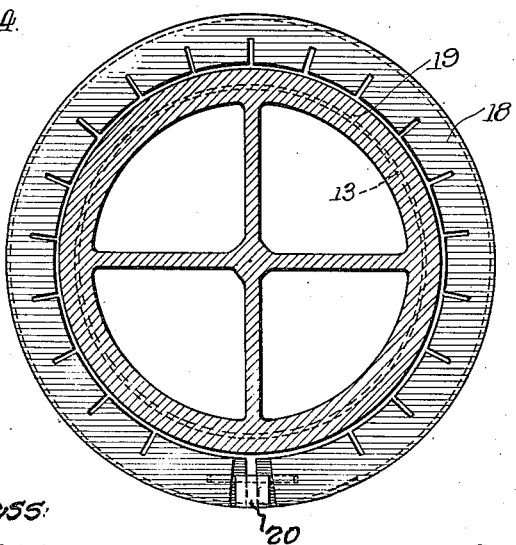
Figure 5:
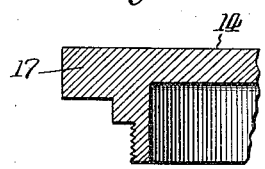
Figure 6:
Figure 7:
Figure 8:
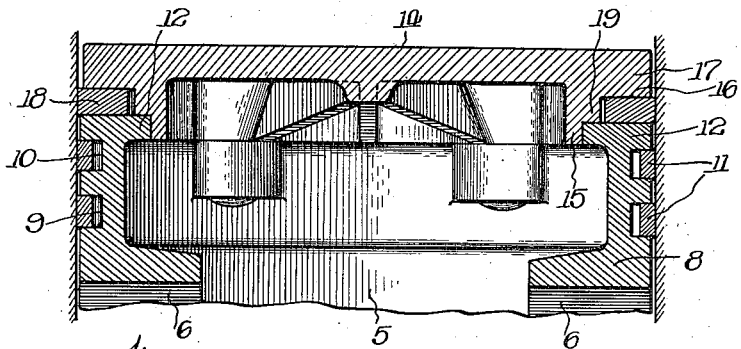
Figure 9:
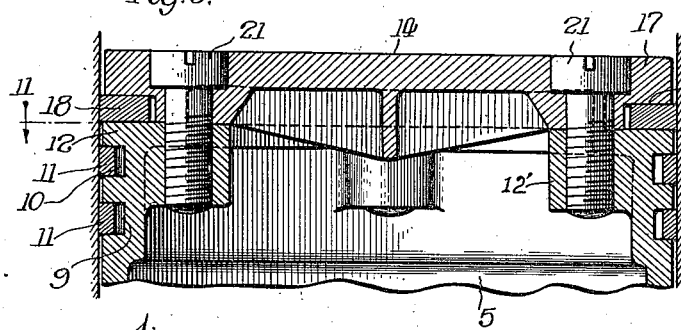
Figure 12:
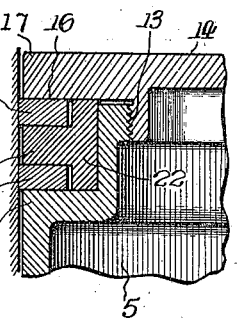
Figure 10:
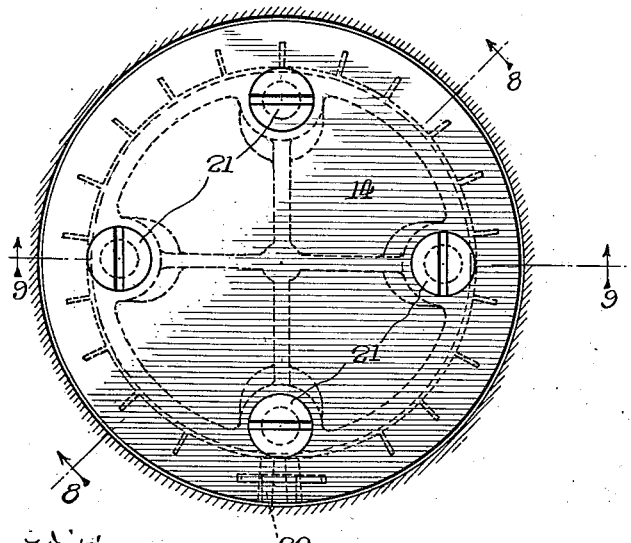
Figure 11:
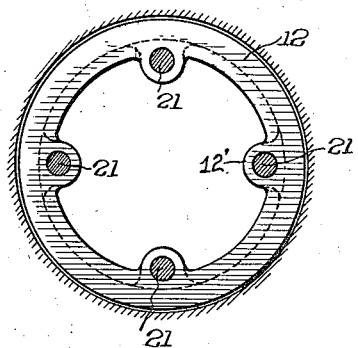

In the accompanying drawings, forming part hereof, Figure 1 is an elevation of a piston embodying my invention; Fig. 2, a plan of the same; Fig. 3, a fragmentary vertical sectional view; Fig. 4, a horizontal sectional view taken on the dotted line 4—4 in Fig. 3 showing the top ring which I may employ; Fig. 5, a detail sectional view of the piston structure shown in Fig. 3; Figs. 6 and 7, a plan and elevation, respectively, of the locking device for uniting the ends of the ring shown in Fig. 4; Figs. 8 and 9, detail sectional views of a modified form of said piston taken on the dotted lines 8—8 and 9—9, respectively; Fig. 10, a plan showing the piston; Fig. 11, a plan showing the internal bosses for uniting the piston sections as seen from the dotted line 11—11 in Fig. 9; and Fig. 12 is a detail sectional view showing a further modification of the piston.

In said drawings, the portions marked, 5, indicate the piston structure shown in Figs. 1 and 2, which is provided with a connecting rod bearing, 6, of any preferred form. Said piston, as hereinbefore indicated, comprises a skirt portion, 8, (Fig. 3) embodying grooves, 9, 10, which are of common or substantially standard dimensions, adapted to receive ordinary piston rings, 11, in general commercial use. In carrying out my invention I prefer to produce the upper end of said skirt 8 with an internally projecting flange, 12, and screw-threaded, as at 13, which enables me to connect thereto an adjustable follower-block, 14, having an exteriorly threaded flange, 15, at its lower end, said block being cut away or offset, at 16, at any desired distance in cross section, so that when said block 14 is screwed into or connected to skirt 8, the offset portion 16 thereof, resulting in the flange, 17, in relation to the upper end 12 of skirt 8, produces a ring groove of any desired dimensions in depth and thickness for receiving a ring, 18. In this manner by increasing or decreasing the width of flange 17 or the depth of flange, 19, I am enabled in a very simple manner to provide a groove of such width or depth, or both, suitable for the reception of the ring 18 to correspond with such grooved dimensions. In employing a ring of the size indicated at 18, which may be of comparatively greater depth than those commonly in use of which I am aware, I prefer substantially that form indicated in Fig. 4 comprising a kerfed or slotted inner circumference to permit of a high degree of flexibility, and the meeting ends of which are connected by a keeper, as 20, indicated in Figs. 6 and 7, but as such ring structure is the subject of my application, Serial No. 450,834, filed March 9th, 1921, it will not be further specifically described herein. It will thus be seen that the two sections 8 and 14 of the piston may be positively secured together to accommodate rings of varying dimensions in depth, and that by enlarging and reducing the width of flange 17 and flange 19 in follower-block 14, a groove may be provided for the reception of a ring of predetermined depth or thickness, or both, as desired.

While I have thus specifically described the preferred construction of my improved piston, it will be understood that I accomplish the same results by securing the follower-block 14 to the skirt 8 by means of several screws, said block having a flanged projection 17 which is seated within the flanged upper end 12 of said skirt 8, which embodies the bosses 12', and the two sections are then united by said screws, 21. As shown in Figs. 8 and 9 I am thus enabled to arrange the rings 11, 18 in the same relation as they are shown in Fig. 2. Instead of providing the flange 15 upon the screw end of follower-block 14 as shown in Fig. 2, I may modify the design of the upper end of skirt 8 (Fig. 12) so that a ring, 22, having a flange, 23, may be placed about said skirt 8, which assemblage provides a groove between the upper side of said flange 23 and the follower-block flange 17, and also another groove between the lower side of the flange 23 and the shoulder, 24, of skirt 8. Said ring 22, as shown in Fig. 12, illustrates how it can be designed to form grooves adapted to receive my preferred form of rings 18, but the dimensions of such ring 22 may be modified to produce grooves of different sizes to receive a large and small ring 18, 11, as indicated in Fig. 2, all of which will be readily understood. As heretofore stated, various changes of construction may be employed for uniting the two piston sections, but because of its simplicity and ready assemblage I prefer the piston form shown in Fig. 2. However, those arrangements shown in the modified forms are also comparatively simple and highly practical, and by either of such forms I accomplish the similar important result of forming a large sized groove for the reception of a ring of deep-cross section for the purposes already explained.

I claim as my invention:

1. In a piston for motors, a skirt section having flanges at its upper end forming a piston ring retaining groove, and a follower-block secured to said skirt section and having a flange spaced from the top flange of said skirt section, said flanges forming a groove larger than said first-mentioned groove for the reception of an enlarged piston ring.

2. In a piston for motors, a skirt section having a plurality of flanges forming a plurality of grooves for the reception of piston rings separated from each other, and a follower-block secured to said skirt section and having a flange spaced from said skirt section for providing a groove larger than said plurality of grooves for the reception of a piston ring larger than said first-mentioned rings and separated therefrom between said follower-block and skirt section.

In testimony whereof I affix my signature.

DAVID P. DAVIES.